United States Patent Office
3,277,485
Patented Oct. 4, 1966

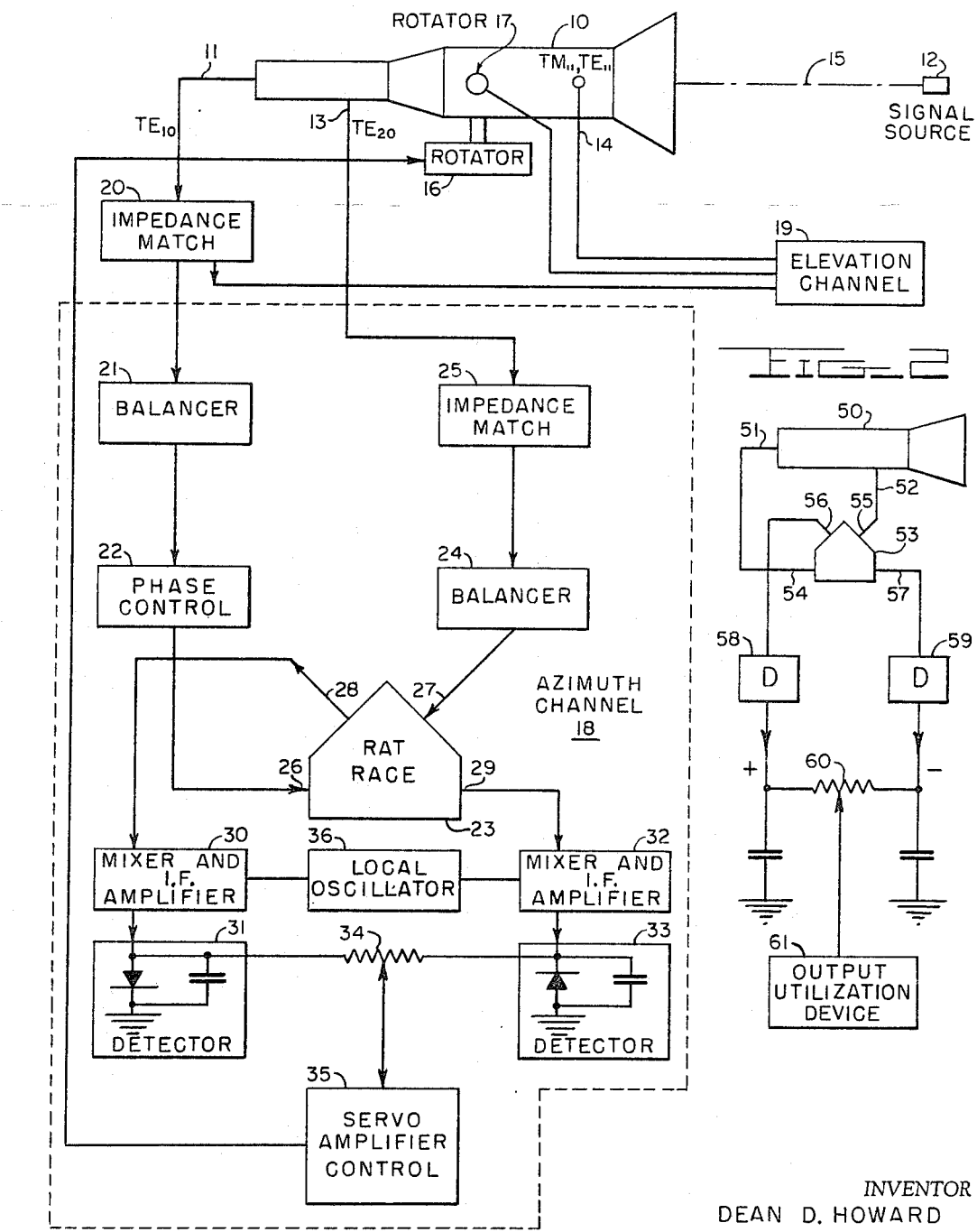

3,277,485
BALANCED CHANNEL MONOPULSE
TRACKING SYSTEM
Dean D. Howard, 4230 Oak Lane, Oxon Hill, Md.
Filed Aug. 14, 1961, Ser. No. 132,269
4 Claims. (Cl. 343—117)

The invention described herein may be manufactured and used by or for the Government of the United States of America for governmental purposes without the payment of any royalties thereon or therefor.

This invention relates to antenna systems in general and in particular to antenna systems having directive properties such as in a direction sensing device or a radar system wherein various sum and difference signals are derived and utilized for determining the direction of a distant object.

In systems of the foregoing types and particularly with the so-called monopulse radar system in which various instantaneous sum and difference signals contain information as to the precise direction of a distant signal source, it is usually necessary that these sum and difference signals be amplified or handled in separate signal channels which themselves do not provide undesirable distortion of the signals. Frequently these channels will include high gain amplifiers and in the typical radar case these amplifiers would be of the fixed tuned frequency selective type known as an intermediate frequency amplifier. The provision of plural channels for such separate signals immediately presents problems because it is difficult to obtain dual channels having identical characteristics particularly where wide ranges of signal amplitudes are involved. Not only do amplifiers inherently possess dissimilar and unstable long term gain characteristics but the characteristics in general are dependent to a significant extent upon the amplitude of the signal involved. Thus an immediate problem presents itself in the monopulse system because of the fact that the "sum" signal is usually many, many times larger in amplitude than the "difference" signals and in fact the difference signals approach the vanishing point when the desired normal relationship in antenna orientation relative to a distant signal source is obtained, namely that in which the antenna is oriented directly toward the signal source. It then becomes a desired arrangement to obtain some way of reducing the tremendous difference in relative amplitude of the signals in such systems.

It is accordingly an object of the present invention to provide a system whereby the "sum" and "difference" signals as set forth in the foregoing are contained as signals of substantially equal amplitude so that signal channels handling such signals can operate at substantially the same relative signal level.

Other objects and many of the attendant advantages of this invention will be readily appreciated as the same becomes better understood by reference to the following detailed description when considered in connection with the accompanying drawing wherein:

FIG. 1 shows a typical embodiment of the features of the present invention as applied to one axis of the normal two axes of a monopulse radar system.

FIG. 2 shows further extension of the principles of the present invention.

With reference now to FIG. 1 of the drawing, the apparatus shown therein typically contains a single horn antenna feed system indicated in general by the reference character 10 which is described in detail in copending application of Bernard L. Lewis, Serial No. 780,175, filed December 12, 1958, entitled "Monopulse Antenna Radar Feed." This antenna with its single horn arrangement derives a sum signal in output line 11 which is proportional to the signal obtained from the signal source 12. This antenna system is typically a receiver portion of a passive system or the receiver portion of a radar system in which a generator of electromagnetic wave energy is connected to line 11 for radiation from the horn device 10 toward a distant object 12 which in that case would not be a signal source but could be merely a passive reflector such as a ship, determination of the location of which is desired. The antenna system 10 contains two additional output signal lines 13 and 14 in which signals appear in amplitude proportionality to the displacement of the distant signal source 12 from a selected, typically central, axis 15 of the antenna horn system. In the usually desired situation wherein the signal source 12 is disposed as shown in the figure directly in line with the axis 15, the signal lines 13 and 14 will normally contain substantially zero output signal, however, when the signal source 12 is displaced in the orthogonal planes commonly designated azimuth and elevation relative to the center axis 15, then signals are derived and appear in the output lines 13 and 14 in phasing and amplitude relationship to the signal in line 11 dependent upon the direction and magnitude of the displacement from the line 15.

The apparatus typified in the figure is an automatic orientation locator device capable of changing the direction of the axis 15 in dependency on the signals on lines 13 and 14 to maintain the line 15 pointed in the direction of the signal source 12 at all times. To this end the horn device 10 is provided with two rotator devices 16 and 17 which are driven by signals obtained from the lines 13 and 14, respectively, to orient the horn 10 to maintain minimum amplitude signals in lines 13 and 14. Thus the rotators 16 and 17 together provide separate orientation control of the horn 10 in two orthogonally related planes to maintain the horn 10 pointing in the direction of the signal source 12 at all times.

Line 11 is connected to the azimuth channel 18 and the elevation channel 19 through an impedance matching device 20 which provides for application of the received signal energy to the two channels without the creation of undesired impedance mismatch conditions. In addition the signal from line 13 is supplied to the azimuth channel 18 and the signal from line 14 is also supplied to the elevation channel 19 in addition to the basic signal of line 11 as delivered to the elevation channel 19 through impedance match device 20.

The azimuth channel 18 and the elevation channel 19 are substantially identical in makeup so that a single detailed showing as typified for the azimuth channel 18 will suffice for both. The basic sum signal of line 11 as delivered through the impedance match device 20 is applied to a balancer 21 which provides a means of selecting the magnitude of the sum signal which is subsequently delivered from the balancer 21 to the phase control 22. The output from the phase control 22 is applied to rat race 23 or equivalent hybrid which are conventional devices now well known in the art for providing controlled sum and difference combination of signals. A second input signal to rat race 23 is from the balancer 24 which is fed from impedance match device 25 which in turn is connected to the line 13 of the horn 10. Thus the rat race 23 is supplied with two input signals at its ports 26 and 27 and provides two output signals at the ports 28 and 29. The output at port 28 is the sum of the signals applied to the ports 26 and 27 whereas the output obtained at port 29 is the difference between the two input signals to ports 26 and 27. Thus these two output signals which contain information as to any error in orientation of the line 15 relative to the signal source 12 in one plane as well as an indication of the overall amplitude of the return signal in line 11 are of somewhat dissimilar amplitude whenever the axis 15 is not in line with the signal source 12, however, under the condition in which the signal source 12 is in line with the axis 15 the signals at ports 28 and 29 will be of equal amplitudes.

Port 28 is connected to an intermediate frequency amplifier 30 the output of which is detected by detector 31, while the port 29 is connected to a second intermediate frequency amplifier 32 the output of which is detected by the detector 33. Detectors 31 and 33 may be conventional detectors shown in this typical instance as being diode unilateral impedance devices shunted by capacitor filtering components, however, it will be noted that the two detectors are polarized as regards the unilateral impedance components thereof to provide opposite polarity outputs. The outputs from the two detectors 31 and 32 are applied to a mixing circuit 34 which in a typical embodiment may be merely a potentiometer or a resistance member of some other configuration, the potentiometer arrangement having desirable properties in that it is possible to select a zero position by convenient manipulation of the slider thereof.

In the condition wherein the signals at ports 28 and 29 are of equal amplitude corresponding to the condition in which the axis 15 is pointed at the distant signal source 12, the mixed output is substantially zero since the two detector outputs of opposite polarity being also of substantially equal amplitude cancel each other. When this equality situation does not exist however, the detector outputs will be of different magnitudes so that the mixer output will be some positive or negative finite amount depending upon the direction and amount of error in orientation of the horn 10 in the azimuth plane. To utilize this output, the mixer is connected to the servo amplifier control 35 which in turn is connected to the rotator 16 to drive the horn device in the azimuth plane to maintain the condition wherein the axis 15 is oriented in the direction of the signal source 12.

The foregoing arrangement relative to the azimuth channel 18 is duplicated as previously mentioned with relation to the elevation channel 19 which will in general have components substantially identical to those of the azimuth channel 18 receiving the two inputs by virtue of connections to the impedance match device 20 and to the line 14 to provide drive signal for rotator 17 by virtue of the connection thereto.

The apparatus arranged in accordance with the foregoing discussion contains the intermediate frequency amplifiers 30 and 32. These channels in keeping with the objects of the invention are driven by two signals which are basically of substantially the same amplitude, differing slightly when the axis 15 of horn 10 is offset relative to the direction of signal source 12 and containing signals of the same amplitude when the axis 15 is pointed in the direction of the signal source 12. With the two amplifiers 30 and 32 thus operative with signals of substantially the same amplitude, the objects of the invention are realized in that it is not necessary to amplify signals of drastically dissimilar amplitude in the prior art manner.

With reference now to FIG. 2 of the drawing, the apparatus of the present invention is shown in a simplified form as a simple tracker device having utility even where amplification stages are not required. As with the apparatus of FIG. 1, this device uses sum plus difference signals and sum minus difference signals which are separately detected and compared as to amplitude. Thus the apparatus employs the same form of antenna as in FIG. 1, the antenna being indicated by reference character 50, with a sum port indicated by 51, and an azimuth difference port indicated by 52. This apparatus works in one plane however with suitable duplication, operation in two planes is readily obtainable.

Ports 51 and 52 are connected to the rat race 53 at ports 54 and 55 thereof with outputs being taken at ports 56 and 57, one as the sum plus difference, the other as the sum minus the difference. The two signals are detected in opposite output polarity by detectors 58 and 59, filtered, then combined in opposition in potentiometer 60.

Output is taken from potentiometer 60 and applied to utilization device 61 which can be merely an indicator such as a zero center voltmeter or a follow-up device to cause tracking by the antenna 50 to maintain antenna orientation as in the apparatus of FIG. 1.

Obviously many modifications and variations of the present invention are possible in the light of the above teachings. It is therefore to be understood that within the scope of the appended claims the invention may be practiced otherwise than as specifically described.

What is claimed is:

1. A signal locator device for determining the direction of a distant signal source comprising, means for deriving a first signal in dependency on signals received in a selected sensitivity pattern, means for deriving a second signal characteristic of the location of a signal source relative to a selected direction in the selected sensitivity pattern, means for deriving sum and difference signals of the first and second signals, differencing means for deriving a control signal in dependency on the amplitude relationship of the sum and difference signals, and means for utilizing said control signal.

2. A signal locator device for determining the direction of a distant signal source comprising, means for deriving a first signal in dependency on signals received in a selected sensitivity pattern, means for deriving a second signal characteristic of the location of a signal source relative to a selected direction in the selected sensitivity pattern, means for deriving sum and difference signals of the first and second signals, separate amplifiers for the sum and difference signals connected to said last named means, differencing means for deriving a control signal in dependency on the amplitude relationship of the amplified sum and difference signals, and means for utilizing said control signal.

3. A signal locator device for determining the direction of a distant signal source comprising, means for deriving a first signal in dependency on signals received in a selected sensitivity pattern, means for deriving a second signal characteristic of the location of a signal source relative to a selected direction in the selected sensitivity pattern, means for deriving sum and difference signals of the first and second signals, separate amplifiers for the sum and difference signals connected to said last named means, differencing means for deriving a control signal in dependency on the amplitude relationship of the amplified sum and difference signals, and means responsive to the control signal for orienting the first and second means whereby equality in the sum and difference signals is obtained.

4. A signal locator device for determining the direction of a distant signal source comprising, antenna means for coupling to an electromagnetic field in two different patterns in dependency upon the direction of incidence of incoming electromagnetic radiation, means for providing a first signal in dependency on the sum of the energy received in the two patterns, means for providing a second signal in dependency on the difference between the energy received in the two patterns, means for deriving sum and difference signals of the first and second signals, differencing means for deriving a control signal in dependency on the amplitude relationship of the sum and difference signals, and means for utilizing said control signal.

References Cited by the Examiner

UNITED STATES PATENTS 3,040,310 6/1962 Hausz _____ 343—117
3,064,254 11/1962 Dickey _____ 343—113

CHESTER L. JUSTUS, *Primary Examiner.*

R. E. BERGER, *Assistant Examiner.*